United States Patent [19]

Campbell et al.

[11] 3,843,839

[45] Oct. 22, 1974

[54] GRAPHIC INDICIA VIDEO SIGNAL ACQUISITION TRANSMISSION AND REPRODUCTION SYSTEM

[75] Inventors: John Scott Campbell; John L. Fairchild, both of Pasadena, Calif.; Robert L. Lafond, San Antonio, Tex.; Carl R. Kolker, San Gabriel, Calif.

[73] Assignee: Faxon Communications Corporation, Pasadena, Calif.

[22] Filed: Dec. 4, 1972

[21] Appl. No.: 312,114

Related U.S. Application Data

[63] Continuation-in-part of Ser. No. 219,249, Jan. 20, 1972, abandoned, which is a continuation-in-part of Ser. No. 875,364, Nov. 10, 1969.

[52] U.S. Cl. .......... 178/6, 178/DIG. 3, 178/DIG. 7, 178/DIG.27, 178/7.6, 178/7.7, 178/69.5 F, 179/2 TV

[51] Int. Cl. ....... H04n 1/12, H04n 1/36, H04n 1/42

[58] Field of Search .............. 178/6, 6.7 R, 6.8, 7.6, 178/7.7, 69.5 F, DIG. 3, DIG. 7, DIG. 28; 179/2 TV, 2 C

[56] References Cited

UNITED STATES PATENTS

| | | | |
|---|---|---|---|
| 3,392,232 | 7/1968 | Cohen | 178/69.5 F |
| 3,458,835 | 7/1969 | Saeger | 178/69.5 F |
| 3,483,318 | 12/1969 | Iwai | 178/69.5 F |
| 3,526,709 | 9/1970 | Butterworth | 178/69.5 F |
| 3,548,099 | 12/1970 | Waybright | 178/7.7 |
| 3,591,711 | 7/1971 | DeGroat | 178/6 |
| 3,693,042 | 9/1972 | Fredkin | 178/7.7 |
| 3,737,570 | 6/1973 | Eckenbrecht | 178/DIG. 28 |

*Primary Examiner*—Howard W. Britton
*Attorney, Agent, or Firm*—Richard Morganstern

[57] ABSTRACT

Apparatus is disclosed for converting graphic indicia such as may be contained in a document or the like, into a composite video signal, transmitting the composite video signal to a remote location using, if desired, a narrow band communication link, and accurately synthesizing the video information at the remote location to provide a faithful copy of the original graphic information.

39 Claims, 29 Drawing Figures

GRAPHIC INDICIA VIDEO SIGNAL ACQUISITION TRANSMISSION AND REPRODUCTION SYSTEM

CROSS REFERENCE TO RELATED APPLICATION

This application is a continuation-in-part of Campbell, Fairchild and LaFond application Ser. No. 219,249 filed Jan. 20, 1972, and now abandoned.

BACKGROUND OF THE INVENTION

1. Field of the Invention

The present invention relates to graphic indicia video signal acquisition systems and, more particularly, to facsimile systems which are adapted to convert documents and the like into composite video information signals, transmit such information signals over a communication link such as a standard narrow band direct-dial telephone line and reproduce the document at a location along the communication link remote from the video signal acquisition and transmission apparatus.

2. Description of the Prior Art

Various systems are known in the art for converting graphic indicia, as represented, for example, by printed documents or the like, to a video signal, transmitting the video signal or its equivalent to a remote location over a transmission link and, thereafter reproducing the document by converting the video information back to graphic form at a remote location along the link.

The most commonly used facsimile system achieves video signal acquisition ("reading") by, inter alia, the technique of providing relative motion of an optical transducer with respect to the document to be reproduced to cause the transducer to scan the whole of the document. The relative motion of the document and transducer is achieved by mechanical transport means which provide various combinations of document motion, transducer motion or both.

The graphic information is typically synthesized at the remote location ("writing") by attempting to reproduce the relative motion of the data acquisition apparatus using transport means which effects relative movement of a writing transducer with respect to a recording medium. Systems which require mechanical motion of either the original copy, reproduction medium or a reading or writing transducer suffer from disadvantages inherently associated with precision mechanical transport apparatus. For example, as the various mechanical components of the transport exhibit wear, the operation of each system will be continuously modified. Thus, long term stability is inherently difficult to achieve. This is a problem of some significance particularly where many randomly interconnected systems which experience variable duty cycles are involved.

In addition, apparatus requiring mechanical motion of reading or writing transducers are subject to inherent flexibility limitations. It is not practical in such systems to rapidly vary the transducer head velocity to any significant degree during either the reading or writing operations. This prevents systems using mechanical transports from reducing data acquisition, transmission and reproduction times by utilizing techniques which require varying the reading or writing speeds to, for example, skip over areas of limited information content.

Another type of known system utilizes a cathode ray tube (CRT) to generate a concentrated beam of light to act as a reading and writing transducer which is deflected along one axis to provide sequential line scans along the fixed axis. The document to be read is moved incrementally past the fixed axis by a drive mechanism so that the entire document may be exposed to the interrogating beam. Video signal acquisition is achieved by positioning a suitable fixed photosensor array proximate the fixed axis to measure the illumination reflected from the document. If the original document is in the form of a transparency, the light levels transmitted through the transparency is sometimes measured. A single axis CRT scan system is disclosed, for example, in Artzt U.S. Pat. No. 3,229,033.

The graphic information is typically synthesized by modulating the beam intensity of a writing CRT with the video signal thus acquired. The modulated writing beam is deflected across a moving photoresponsive medium in a process essentially the reverse of that described with respect to data acquisition. Such systems suffer from many of the same disadvantages previously discussed in that mechanical motion of the original document and reproduction medium is required.

Facsimile systems using various aspects of CRT technology are described in an article entitled *Facsimile Scanning by Cathode Ray Tube* by W. H. Bliss and C. J. Young published in the September 1954 issue of the RCA REVIEW. A video encoding device using a helical CRT raster scan to encode limited size symbols substantially one at a time with relative movement between the CRT assembly and document being required to cover the entire document is disclosed in King U.S. Pat. No. 3,039,081.

Many known CRT systems require a document to be first converted to a reduced size intermediate (such as an intermediate transparency). The reduced size transparency is then scanned as by the CRT process previously indicated. Synthesis of the original document has typically involved the production of a new reduced size intermediate at the writing location. The new intermediate may then be enlarged to the desired copy size.

Such apparatus also suffers from rather obvious disadvantages. In both transmission and reception the graphic information must first be embodied in an intermediate reduced size medium. This adds additional procedural steps and increases the complexity and cost of the apparatus. It also substantially increases both the time of equipment operation and operator time requirements. Further, the necessity of using a reduced size medium to satisfy the requirements of such systems introduces one more operation where information content may be lost or degraded. A wide band CRT system using a reduced size intermediate (film) is disclosed in an article entitled *UltraFax* by D. S. Bond and V. J. Duke published in the March 1949 issue of the RCA REVIEW.

Still another prior art approach illuminates either the original copy or a reduced size intermediate transparency and focuses the reflected or projected image onto a scanning plane such as the photosensitive surface of an image orthicon. The photosensitive surface is thereafter scanned by an electron beam to develop the video signal. Apparatus of this general type is described, for example, in U.S. Pat. No. 3,526,709 to Butterworth. For a number of reasons, this has been found to be too inefficient an approach. First, a separate writing transducer is required in each unit for transceiver operation. Further, geometric distortion is experienced in attempting to control a writing transducer of one type (such as a CRT) with information acquired with a reading transducer of a second type (such as an image orthicon).

The ideal facsimile reading and writing operations should preferably be characterized by high speed and low transducer inertia. Cathode ray tube (CRT) two axis raster scanning meets these criteria in that theoretically scanning velocity is limited only by the sensitivity of available photosensitive devices used for scanning or recording. Further, the scanning beam has practically zero scanning intertia and can be controlled in velocity and position substantially at will.

The ideal CRT system should require neither a reduced size intermediate (for either reading or writing operations) nor a precisely driven mechanical transducer or copy transport.

A number of significant problems have heretofore prevented the successful development of such a CRT facsimile system. First, to acquire the raw video information it is necessary to illuminate the original copy utilizing a suitable raster scan (such as a rectangular line-by-line scan) and detect the illumination reflected from each point of the copy with a photosensitive device. For successful facsimile operation, the video signal acquisition must be achieved with higher fidelity than that required for most television communication systems. An example of a CRT raster scan television intercommunication system of the type developed in the 1940's before the availability of modern television cameras is disclosed in Szegho et al. U.S. Pat. No. 2,537,173.

For the detected light levels to be acceptable for systems (such as facsimile) where fine detail information is required, it is necessary, inter alia, to maintain a uniformly high signal to noise ratio and properly focused point of light over the entire target plane. To achieve such a uniformly high signal to noise ratio the photosensitive pickup means should be positioned at each point in the scan so as to present a substantially constant spatial relationship with each illuminated portion of the medium containing the graphic information.

By carefully selecting photosensor form factors it is possible to achieve an acceptable result for a document which is relatively small in size. No acceptable photosensor configuration has heretofore been devised to achieve workable results with large surface areas associated with a stationary target area corresponding to document sizes on the order of 8½ by 11 inches or more. Facsimile systems should accommodate such sizes to be commercially significant.

A further area of difficulty in CRT systems involves the problem of geometric distortion. Geometric distortion is caused by inherent non-linearities in available CRT scan mechanisms and associated optics. Any solution to this problem must take into consideration not only the non-linear characteristics of the data aquisition and transmission (reading) apparatus but also the non-linear characteristics of the remote receiving and synthesizing (writing) apparatus.

A still further area of difficulty is the poor signal transmission characteristics of available common carrier channels. For the greatest utility, a facsimile system should be capable of performing over the most widely available office accessible transmission facilities which is presently the narrow band directdial telephone network (DDN). As is well known, a variety of random signal distortion characteristics are presented by this network. Signal distortion in the environment of a CRT facsimile system is particularly harmful. Accurate transmission and detection of the composite video information including the synchronizing information is thus a prerequisite to successful operation of any CRT facsimile system.

All of these problems must be viewed from the perspective that a commercially acceptable facsimile system must not only be capable of acquiring, transmitting and remotely synthesizing video information but must also do so with equipment exhibiting high reliability and speed, low cost and simplicity of operation. Accordingly, costly and complex special purpose CRT's, optical systems, control systems and photosensitive arrays must be avoided. The many problems and opposed cost and performance criteria have heretofore prevented the successful development of commercially acceptable stationary target raster scan CRT facsimile systems.

SUMMARY OF THE INVENTION

In accordance with the present invention, a novel graphic indicia video signal acquisition, transmission and remote video signal synthesizing system is disclosed which solves the aboveindicated problems. The novel aspects are disclosed in the environment of a facimsile system which is adapted to "read" a document, transmit the acquired composite video signals over a standard telephone direct-dial communication link and synthesize the video information at a location along the communication link remote from the reading apparatus.

Each unit is capable of operating as a transceiver with maximum common use of major components. Each unit includes a cathode ray tube (CRT) juxtaposed to a target mounting means. In the reading mode, the target mounting means is adapted to hold a medium containing information in graphic form such as a document or the like. The CRT is controlled so as to generate a constant intensity flying spot scanner beam adapted to illuminate successive points on the document with a constant intensity point of light. In the writing (synthesis) mode, the target location is adapted to hold a photoresponsive material which is capable of recording graphic indicia as a function of the intensity and position of the CRT writing beam. In this mode the intensity and position of the CRT light beam is modulated by the received composite video signals.

An optical lens assembly is positioned between the cathode ray tube and the target mounting means to focus the CRT beam upon the target surface. In the preferred embodiment, the CRT is a standard, inexpensive, commercially available variety having a generally spherical outer surface and a standard beam deflection means. To assure that the CRT beam is acceptably focused at all times on the target plane, the target plane is preferably provided with a curvature along at least one axis to approximate the complex surface which defines the actual locus of focal points of the CRT light beam at the target location.

In the reading mode, means are provided to deflect the CRT beam to cause the constant intensity reading beam to raster scan a document located at the target surface with a flying point of light preferably in a sequential line-by-line manner. Photoresponsive means are positioned relative to the interrogating beam and the document to intercept illumination reflected from the document in a non-spectral fashion. Means are provided to cause the photoresponsive means to maintain a predetermined spatial relationship with respect to the CRT interrogating beam and document. The latter means includes means for moving the photoresponsive means preferably in synchronism with the vertical position of the interrogating CRT beam. Thus, the photoresponsive means will always intercept illumination at a desired predetermined positional relationship to the interrogating beam and document thus assuring a uniformly high signal to noise ratio and uniform light detection. The photoresponsive means provides an output video signal which after combination with suitable synchronizing (sync) pulses is in the form of a composite video signal suitable for controlling the intensity and position of a remotely located "writing" CRT.

The line-by-line raster is preferably vertically incremented during the horizontal blanking periods which periods are defined by the synchronizing pulses. The CRT vertical deflection drive thus preferably receives drive current during the period defined by the synchronizing pulses. Means are provided for selectively varying the time duration of these sync pulses to provide selective vertical resolution. The photoresponsive means output and sync pulses are applied to modem means which provides a modulated output signal containg the document density and synchronizing information in a form suitable for transmission by the standard direct-dial telephone network.

In the disclosed preferred embodiment, the modem means includes a voltage control oscillator the output of which is a sine wave, the frequency of which varies as a function of the input signal amplitude. Means are also provided to cause the output modem means signal to assume a first predetermined frequency level for "pre-sync" and "post-sync" time increments both before and after each sync pulse and a second predetermined frequency level for the sync period.

The transmitted video information is received by another preferably identical transceiver located at some point along the transmission link remote from the transmitting transceiver. The received signal is demodulated by modem means at the remote unit to provide a demodulated composite video signal. The detected video portion of the demodulated composite video signal modulates the intensity of the remote transceiver CRT. The beam position of the remote CRT is slaved to synchronize with the reading unit CRT by the detected sync signals.

Sandwiching the sync signals between pre-sync and post-sync signals of fixed frequency compensates for the signal distortion characteristics of the transmission link and thus allows accurate detection and demodulation of the synchronizing signals.

In the writing mode, a suitable photosensitive medium is preferably positioned at the target mounting means of the remote transeiver unit. The photosensitive medium is exposed to the remote transceiver CRT beam which is intensity modulated by the received video signal. The remote CRT beam thus scans the photosensitive medium under the positional control of the transmitted sync information to reproduce the original document at the remote transceiver location.

Matched CRT's, CRT drive electronics and optical components are preferably used in all transceivers. Non-linearities associated with the reading operation are thus reproduced in the write operation. This results in the cancellation of geometric distortion caused by such non-linearities without the requirement of either sophisticated CRT's, electronic or optical components.

Systems constructed in accordance with the principles of the present invention thus may use inexpensive CRT's, electronic and optical components to provide an efficient, reliable, low cost facsimile transceiver which overcomes the limitations of prior art facsimile devices. Neither reduced size intermediates nor mechanical transports for moving either the light source, document and/or reproduction medium are required.

Other novel aspects, features, and attendent advantages of the invention will be apparent to those skilled in the pertinent art from a reading of the following description of preferred embodiments constructed in accordance therewith taken together with the accompanying drawings wherein:

DETAILED DESCRIPTION OF THE PREFERRED EMBODIMENTS

Figure 1:
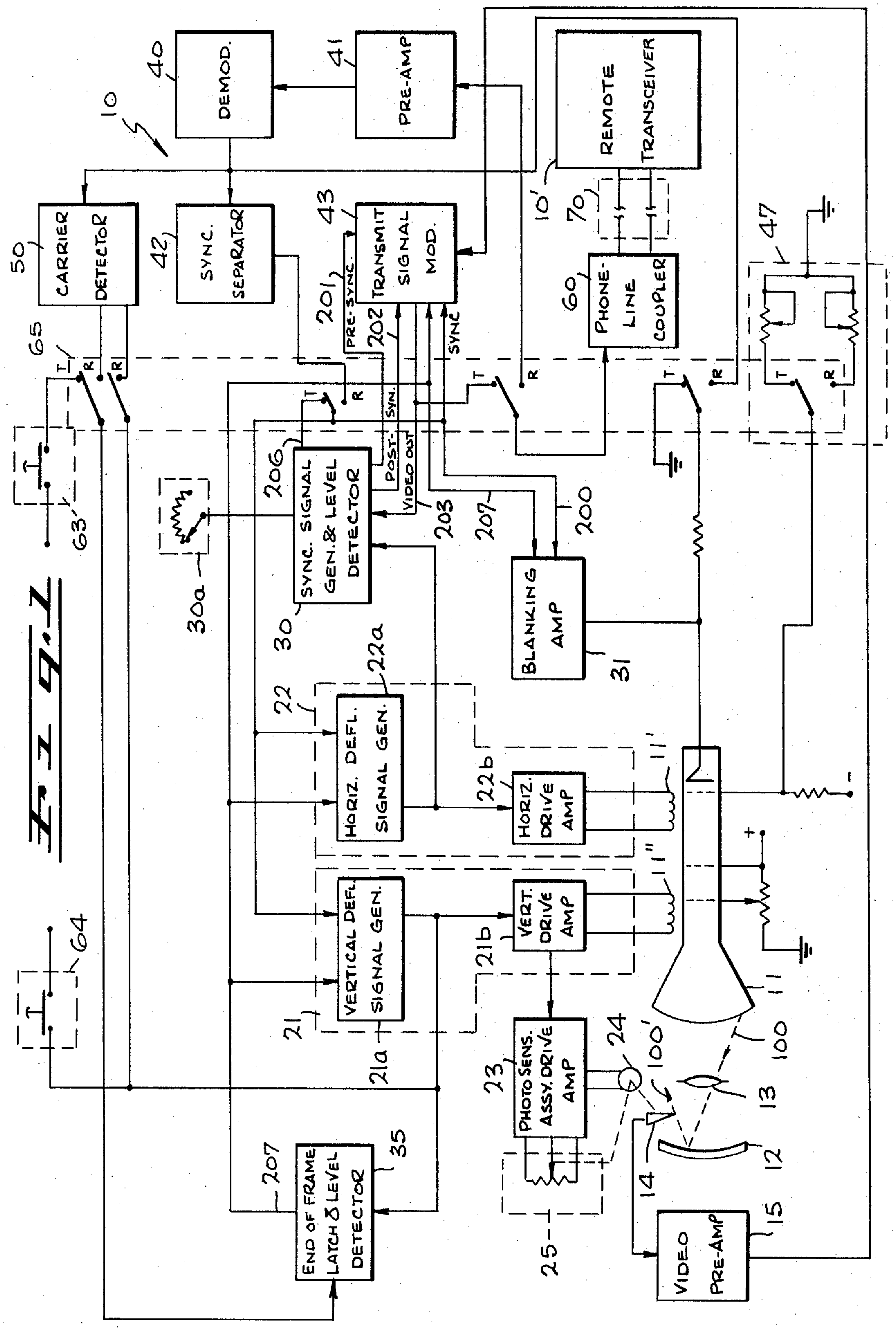
FIG. 1 is a block diagram of an exemplary facsimile system constructed in accordance with the principles of the invention.
Figure 2:
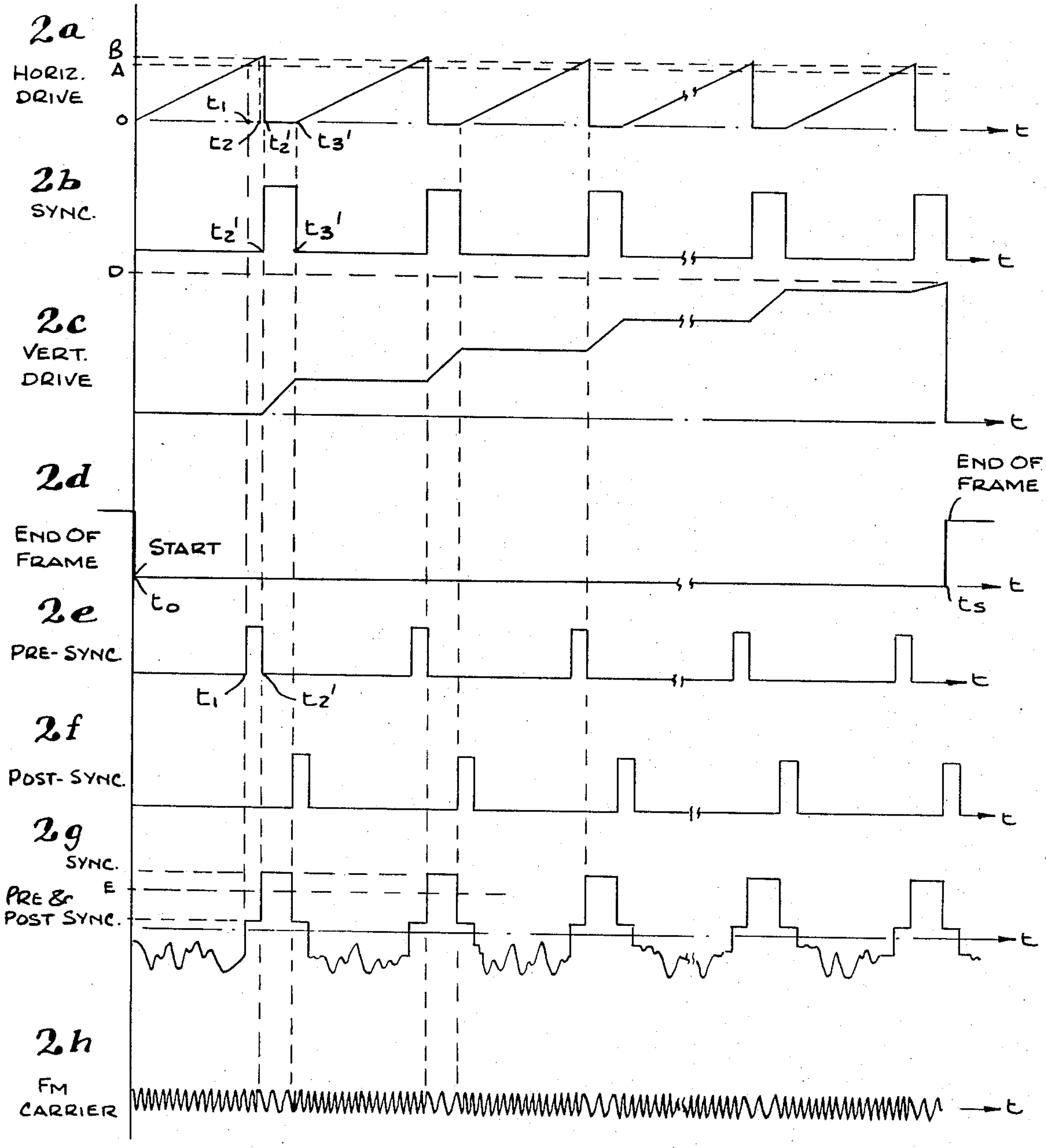
FIG. 2 comprised of FIGS. 2*a*–2*h* shows a series of exemplary signal waveforms helpful in understanding the operation of the apparatus of FIG. 1.

Referring now to FIG. 1, a block diagram of an exemplary transceiver apparatus 10 constructed in accordance with the principles of the invention is shown. The operation of the apparatus of FIG. 1 will best be understood having additional reference to the waveform diagrams of FIGS. 2 and 4.

The apparatus of FIG. 1 includes a cathode ray tube (CRT) 11 which is positioned so as to direct a flying spot of light defined by beam 100, focused by a lens assembly 13, onto a target 12. The transceiver apparatus 10 of FIG. 1 is capable of both acquiring and transmitting information functionally related to graphic indicia (such as contained on a written document or the like) and of receiving and synthesizing information transmitted from a remote location (such as that of remote tranceiver 10').

In the data acquisition and transmission mode (transmitting mode), the document (not shown) is mounted at the target 12 so as to have successive points on the document illuminated by the CRT light beam 100 in a manner to be hereinafter described in greater detail. The horizontal position of the interrogating CRT beam is controlled by horizontal deflection drive 22 which includes a horizontal deflection ramp signal generator 22*a* and amplifier 22*b*, the output of which is applied to the horizontal deflection yoke 11' of the CRT (FIG. 2*a*). The vertical position of the CRT beam is controlled by vertical CRT deflection drive 21 which includes a vertical deflection signal generator 21*a* and amplifier 21*b*, the output of which is applied to the vertical deflection yoke 11'' of the CRT (FIG. 2*c*).

A blanking amplifier 31 is provided for shutting off the cathode of CRT 11 for appropriate time intervals. A sync signal generator 30 generates appropriate horizontal sync signals during data acquisition in a manner to be hereinafter described (FIG. 2*b*).

Prior to data acquisition and transmission, a multi-contact mode selection switch 65 is placed in a "transmit" (T) position, as shown. Initially the system is adapted to remain in a "transmit standby" state. In this state the cathode of the CRT is blanked and, of course, no scanning takes place. End of frame latch and level detector 35 provides an inhibit output signal on line 207 which inhibits vertical CRT drive 21 and horizontal CRT drive 22 as well as a transmit signal modulator 43.

To initiate data acquisition and transmission, a manual start switch 63 may be depressed as at time $t_o$. This resets end of frame latch and level detector 35 and causes it to change its output state (FIG. 2*d*). The change of state functions as a start signal. Blanking amplifier 31 is unmuted and is thereafter controlled by sync signal generator 30. With mode selector switch in the transmit position, the cathode of CRT 11 is connected to ground. It thus receives a constant drive potential. CRT 11 will therefore generate a constant intensity beam, the brightness of which may be set by brightness control 47 which controls the CRT cathode control grid.

At the same time ($t_o$) horizontal CRT drive 22 and vertical CRT drive 21 are both unmuted and placed under the control of sync generator 30. The horizontal and vertical CRT drives deflect the CRT beam 100 to cause it to raster scan the document located at focal plane 12 with a sequential series of vertically spaced horizontal line scans. Each line scan is vertically displaced from the preceding scan by a predetermined amount. The horizontal and vertical yoke drive waveforms are shown respectively in FIGS. 2*a* and 2*c*.

The flying point of light moves across the document at a lineal rate which is set by the horizontal CRT yoke drive 22. Photosensor means 14 is positioned (in a manner to be more particularly described hereinafter) to intercept the non-spectral energy reflection from the document. The output of photosensor means 14 is thus, at any point in time, an analog video signal which is a function of the image density of the document point being illuminated. The video signal output of photosensor 14 is coupled to a video preamplifier 15. The output of preamplifier 15 is coupled to a transmit signal modulator 43. Modulator 43 is preferably a voltage controlled oscillator which provides a frequency modulated output signal having a frequency which is a function of the input analog video signal level except during pre-sync, sync and post-sync times when preselected signal levels are used as hereinafter described. The frequency range for the composite video signal is chosen to be suitable for transmission over the particular communication link selected, as hereinafter described.

The output of transmit signal generator 43 is applied to a transmission line coupler 60. Coupler 60 may be any suitable interface which is acceptable for connecting the transmit signal modulator output to the transmission link which may be, as indicated in FIG. 1, a standard narrow band direct-dial telephone line 70. The composite video signal is transmitted by transmission line 70 to a second remote transceiver system 10' which, as hereinafter described, is preferably a duplicate of transceiver 10.

Turning now to the data acquisition and transmission operation in more detail, let us assume that data acquisition is initiated at $t_o$. As the first horizontal scan traverses the width of the document located at the target 12, the horizontal drive signal will eventually reach a voltage level A (FIGS. 2*a* and 4*a*) at time $t_1$. This level is detected by sync signal generator and level detector 30.

At $t_1$, sync signal generator 30 provides a pre-sync signal to transmit signal modulator 43 via line 201 (FIG. 2*e*). The pre-sync signal takes priority over any video signal input to modulator 43. The output of transmit signal modulator 43 is forced by the pre-sync signal to assume a predetermined fixed pre-sync frequency.

At some time after the horizontal drive signal reaches level A, the signal will reach a second level B (as best seen in FIG. 4*a*). In the preferred embodiment, the sync signal generator level detector and horizontal drive signal generator are designed to provide a pre-sync period (defined by the time required to reach level B from level A) of approximately 2ms.

It should be noted that the horizontal sync signal generator 30 is also provided via line 203 with the output of the transmit signal modulator 43. At the point in time ($t_2$) when the horizontal drive signal reaches level B, horizontal sync signal generator 30 monitors the output of transmit signal modulator 43 until the first zero crossover of the modulator output after level B is reached is detected. At that time ($t_2'$), sync signal generator 30 provides a sync signal output (FIGS. 2b and 4f) on line 206 which signal is applied via line 200 to modulator 43.

As will be more fully explained hereinafter, the sync signal is of a predetermined duration and preferably adapted both to start and terminate at a zero crossover of the transmit signal modulator output. A sync signal waveform train is illustrated in FIG. 2b. The sync signal is a priority input to modulator 43 and forces the output of the modulator to a predetermined fixed sync frequency which differs from the modulator output pre-sync frequency by a selected frequency difference. Transmit signal modulator 42 will thus provide an output signal during the sync period which is peculiar to and representative of the sync period.

The sync signal derived from line 206 of sync signal generator 30 is also applied to horizontal drive signal generator 22 and vertical drive generator 21. It resets the horizontal drive signal generator to maintain it at a zero output level during the sync period. Presence of the sync signal causes the vertical drive signal generator to develop a linear drive (starting at $t_2'$) which increments the vertical position of a CRT scanning beam at a predetermined rate. The vertical drive waveform, as shown in FIG. 2c, is preferably operational during the entire sync period. Thus, the vertical distance between successive line scans is a function both of the vertical drive signal rate and the duration of the sync period. For any fixed vertical drive rate, therefor, the vertical resolution of the system may be controlled by simply varying the sync period. Provisions for selectively varying the sync intervals and thus selecting different vertical resolutions are schematically illustrated by vertical resolution control 30a of FIG. 1.

At the termination of the sync period, sync signal generator 30 waits for a 0° crossover of the output of transmit signal modulator 43. At such a 0° crossover the sync pulse is terminated and sync generator 30 provides, on output line 202, a post-sync signal as shown in FIG. 2f. The post-sync signal is also a priority input to modulator 43. It causes the output of the modulator 43 to assume a fixed post-sync frequency level which is preferable identical to the pre-sync frequency level. The post-sync period preferably has approximately the same time duration as the pre-sync signal. Termination of the sync signal also both allows horizontal drive signal generator 22 to initiate the next horizontal line scan and disables blanking amplifier 31 to terminate the CRT blanking period.

Turning briefly to a description of the modulated composite video signal the output of transmit signal modulator 43 is a frequency modulated waveform (FIG. 2h). The frequency of the output waveform varies continuously between first, second and intermediate levels corresponding to the document density variation from black to white including intermediate gray levels. The output of modulator 43 is a third preselected frequency different from the video signal frequencies during the pre-sync interval. Pre-sync is followed by a fourth preselected frequency signal different from the video signal frequencies and the pre-sync frequency during the sync period. The sync signal is followed by a post-sync signal which is at the same frequency as the pre-sync signal.

It is to be noted that the transition from pre-sync to sync and sync to post-sync takes place at zero phase crossover points of the output signal. Thus, there is no discontinuity in going between pre-sync and sync and sync and post-sync. Further, the frequency shift into and out of sync from pre-sync to post-sync will always be an equal frequency difference. This is important where communication links such as the direct-dial phone network are used since such networks have distortion characteristics wherein all frequencies do not travel at the same rate. The control over the frequency conditions at pre- and post-sync times adds the necessary stability to the pulse width of the detected sync pulses since the delay distortion will be symmetrical in pre- and post-sync transitions. This feature will be discussed further below.

Communication links, such as the direct-dial telephone networks, have distortion characteristics, such as, inter alia, envelope delay distortion wherein different frequencies travel at different rates. These characteristics of envelope delay distortion vary considerably from line to line. This is especially so at the extremes of the information bandwidth. The direct dial phone network has a bandwidth which extends approximately from 400 to 2400 Hz. Frequencies between 1400 Hz and 2000 Hz are generally more immune to envelope delay distortion and are therefore selected to define the operating pre-sync, sync and post-sync bandwidth.

It is normally desirable to transmit the video information on the upper frequencies of this band so that the rate of transmission can be maximized. It is also desirable to transmit the synchronizing information in such a way that it has maximum immunity to the envelope delay distortion characteristics which may be experienced. A method has to be devised therefore to provide a stable and predictable modem for sync generation and detection.

It should be understood that accurate sync information is defined not only by a point in time but also be a precise period (pulse width). This is so since the receiver CRT, as hereinafter described, is slaved to the sync pulse width for generating its vertical increment. The vertical increment, in turn, defines the vertical resolution in horizontal lines per inch. Means are therefore required to accurately control the generation, transmission and detection of the synchronizing information.

In accordance with the present invention just prior to sync generation, the carrier is shifted to a preset frequency (pre-sync) which, as above described, is a predetermined frequency difference from the synchronizing signal frequency. The synchronizing signal, itself, is then generated for a predetermined time at a lower frequency differing from the pre-sync frequency by the predetermined difference amount. After termination of the sync period, the carrier is shifted back to the same frequency as the pre-sync frequency (post-sync) for a time sufficient to assure stability of the trailing edge of the sync signal.

The control over the dynamics of the frequency shift between pre-sync and sync, and sync and post-sync adds the necessary stability to the pulse width of a detected sync pulse. This is so since the delay distortion will be symmetrical for both frequency shifts. That is, the leading wave of the synchronizing signal will be delayed in an amount equal to the trailing wave of the synchronizing signal. Thus, the overall detected pulse width will remain constant.

Still another consideration in connection with sync stability relates to a distortion observable in facsimile systems which results from lack of registration of the data from line to line, a phenomenon known as horizontal jitter. This occurs due to the trailing edge of the received sync pulse varying with respect to the trailing edge of the transmitted pulses. Control over horizontal jitter is achieved in accordance with the present invention by a method of modulation which assures crossover synchronization of any frequency shifts associated with the generation of a sync pulse. This is effected, as above described, by synchronizing the initiation and termination of each synchronizing signal with zero crossovers of the transmitter signal modulator to avoid transients that would otherwise be generated by causing a frequency shift at variable times during a cycle other than zero crossovers.

Figures 3, 5:
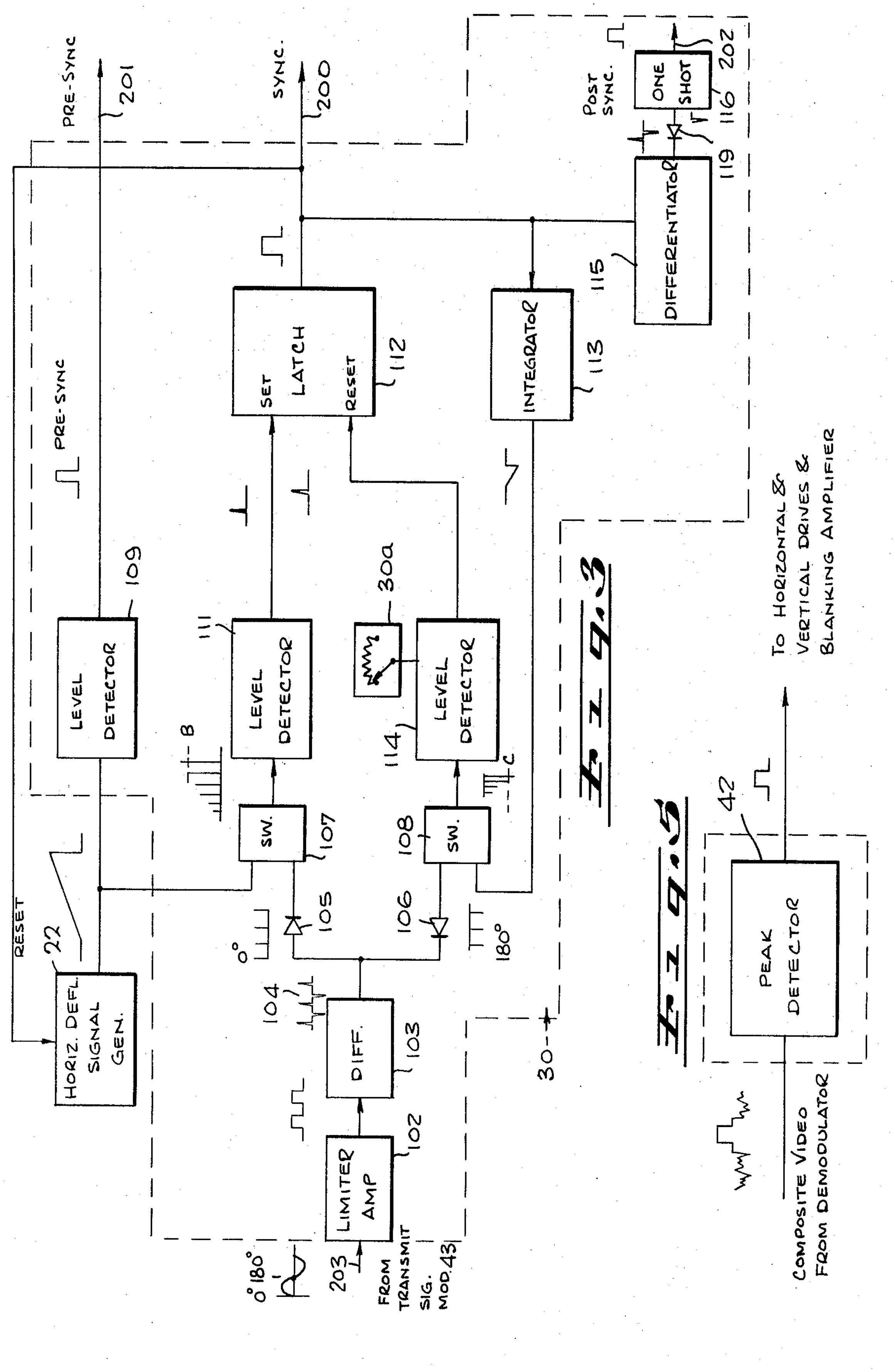
FIG. 3 is a block diagram of the horizontal sync signal generator of FIG. 1 constructed in accordance with the principles of the invention.
FIG. 5 is a block diagram of an exemplary sync separator circuit of FIG. 1.
Figure 4:
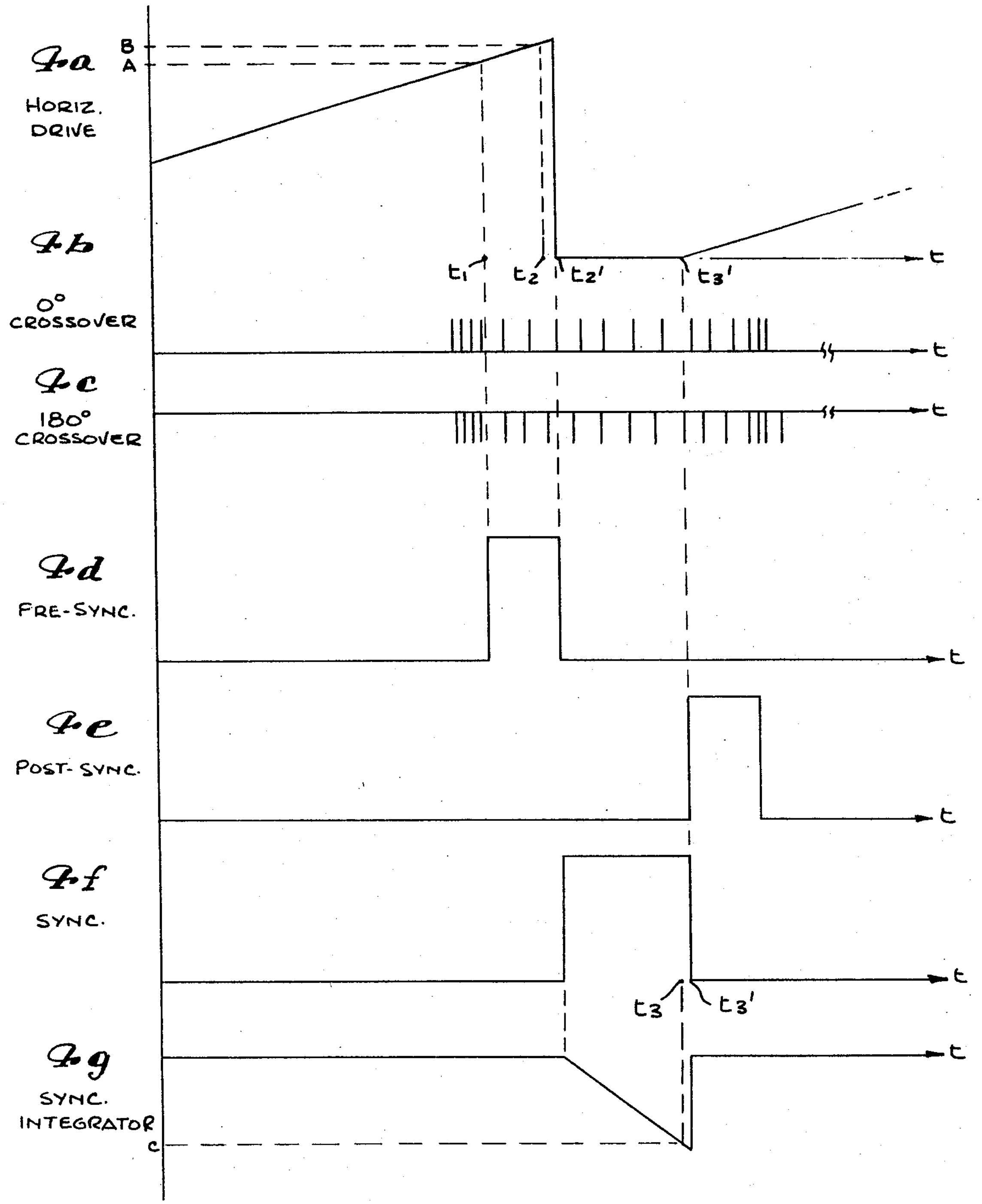
FIG. 4 comprised of FIGS. 4*a*–4*g* is a series of waveforms helpful in understanding the operation of the sync signal generator of FIG. 3.

The sync signal generation system will not be considered in more detail with reference to FIGS. 3 and 4. It will be helpful to recollect that the transmit signal modulator 43 of FIG. 1 is so arranged that any pre-sync, sync or post-sync signal has priority control over the output frequency regardless of the presence of a video input to the transmit signal mosulator when these signals are present.

Referring now in detail in FIG. 3, the input on line 203 from transmit signal modulator 43 is limited by a limiter amplifier 102 which is coupled to and differentiated by a differentiator 103. A pair of oppositely poled diodes 105 and 106 distribute the 0° crossover and 180° crossover components to analog switches 107 and 108, respectively. These signals are shown by waveforms 4*b* and 4*c*. The other input to switch 107 is the horizontal drive ramp function waveforms 4a. Switches 107 and 108 are normally open except when toggled by the 0° and 180° signals to strobe the analog input.

The horizontal drive signal is first level detected by a level detector 109 at a level A (FIG. 4*a*). Level A is preferably selected to occur in time approximately two milleseconds before the desired start of the sync signal. The output of threshold detector 109 provides a pre-sync output pulse to the transmit signal modulator (FIG. 4*d*). The leading edge of the pre-sync signal is not necessarily required to be synchronized with any given phase of the output of transmit signal modulator 43. The pre-sync signal forces the transmit signal modulator to go to a predetermined frequency which, in the preferred embodiment, has been selected as 1750 Hz.

As shown, the horizontal deflection signal generator output ramp (FIG. 4*a*) is also applied to switch 107. Switch 107 also receives the 0° crossover pulses from differentiator 103 which act as strobes. The output of switch 107 progressively increases in amplitude with the horizontal deflection signal ramp. The output of switch 107 is applied to a level detector 111 which is set at a level B occurring at time $t_2$ (FIG. 4*a*). Level B is somewhat higher than level A. Level A, it may be recalled, is used to initiate the pre-sync signal.

Since level detector 111 is actually initiated by an output pulse from switch 107, the 0° crossover pulse at the time of or immediately following the point in time when horizontal deflection signal generator ramp reaches level B will be the initiating pulse (at time $t_2'$).

Level detector 111 generates a trigger signal which sets a latch 112 changing the logic state of the latch. The output of latch 112 is the sync signal (FIG. 4*f*).

It will be appreciated that the initiation of the sync signal is thus synchorinized with the zero degree crossover of the transmit signal modulator 43, thus eliminating spurious wavefront transients from being generated by the transmit signal modulator at the transition from pre-sync to sync. The initiation of the sync signal also serves to reset horizontal deflection signal generator 22 which terminates the pre-sync signal.

The sync pulse is also coupled to an integrator 113. The output of integrator 113 (FIG. 4g) is coupled as one input of an switch 108. The other input to switch 108 is the 180° crossovers from differentiator 103 (FIG. 4c). The 180° crossover pulses thus strob the output of integrator 113.

The output of switch 108 is applied to a level detector 114. Detector 114 provides a reset signal to latch 112 to terminate the sync period when the output of switch 108 (which corresponds to the strobed output of integrator 113) is equal or greater than a preselected level (level C FIG. 4*g*). It should be noted that, as shown in FIG. 4*g*, the output of sync integrator 113 actually reaches level C at a time $t_3$ but is not strobed into level detector 114 until the next 180° crossover of the transmit signal modulator signal ($t_3'$). Termination of the sync signal is therefore also synchronized with a 0° (or in this case, a 180°) crossover of the output of transmit signal modulator 43, thus eliminating wavefront transients at the transition from sync to post-sync. The termination of the sync pulse represented by the change in level state of latch 112 also causes the horizontal deflection signal generator 22 to initiate a new horizontal CRT drive ramp (FIG. 4*a*).

As shown, the output of latch 112 is also applied to a differentiator 115. The output of differentiator 115 is coupled via a back biased diode 119 to a one-shot 116. The trailing edge of the sync signal therefore serves to initiate one-shot 116 which generates the post-sync signal (FIG. 4*e*). The post-sync signal also is preferably of a duration of approximately two milleseconds as set by the one-shot 116. It will be noted that the end of the post-sync signal is not necessarily required to be synchronized with any particular phase of the output of the transmit signal modulator 43.

The duration of the sync pulse is thus a function of the internal timing of integrator 113 and the level to which level detector 114 is set. Therefore, The width of the sync pulse may be selectively controlled by variable settings at either location. This is indicated conceptually in FIG. 3 by a control pot 30*a* which may be used to vary the level to which level detector 114 may be set before it provides a reset signal to latch 112.

The system as thus far described scans a document located at the target 12 (FIG. 1) in a line-by-line manner with each successive horizontal line scan being spaced from the preceding horizontal line by a vertical increment which is a function of the verticle drive rate and the duration of the sync period as defined by the sync pulse width. The vertical drive waveform is illustrated in FIG. 2c. The output from the vertical drive signal generator 21 is also applied to the end of frame latch and level detector 35 which monitors the vertical drive signal level and provides an end of frame signal at tim $t_3$ (FIG. 2*d*) when the vertical drive signal reaches a preselected level (level D, FIG. 2*c*) corresponding to the end of the scanning frame. The end of frame signal inhibits the vertical and horizontal drives and the transmit signal modulator and initiates the CRT blanking amplifier to thereby reset the system to "standby".

During scanning, the output of modulator 43, comprising the frequency encoded composite video information, is supplied to phone line coupler 60. Coupler 60 couples the information to the direct-dial network 70. The composite video information is thus transmitted over the direct-dial network to any remotely positioned transceiver 10′. Transceiver 10′ is, of course, similarly coupled to the direct-dial network. Since transceiver 10′ is preferably identical to transceiver 10, the reception and data synthesis mode ("writing mode") of this invention will be described with respect to the system 10 shown in FIG. 1, it being understood that the description will in all respects suffice to describe the remote operation of the transceiver 10′.

In the writing mode, therefor, mode selector switch 65 is thrown to place the switch contacts in the R position shown in FIG. 1. Initially, prior to receipt of the composite video carrier, transceiver 10 is in a "receive standby" state. In this state, the end of frame latch and level detector 35 has a high output signal at line 200. This inhibits the vertical and horizontal drive signal generators 21 and 22 and maintains blanking of the cathode of CRT 11 by blanking amplifier 31. In the receive mode, signals transmitted over transmission link 70 are coupled, via phone line coupler 60, to a preamplifier 41. The output from pre-amplifier 41 is coupled to a signal demodulator 40. Demodulator 40 may be a frequency to voltage converter which provides an analog output signal the amplitude of which varies as a function of the instantaneous frequency of the transmitted composite video signal (FIG. 2*g*). One output from demodulator 40 is applied to an automatic start carrier detector 50.

Detector 50 detects the presence of a received carrier signal and provides an initiation signal ("start writing signal") as an output. The start signal is distributed to the end of frame latch 35 which causes line 200 to go low, thereby releasing horizontal and vertical CRT drives 22 and 21 and unblanking the CRT cathode. The horizontal and vertical CRT drives are thereafter under the control of the sync signals derived from a sync separator 42. Sync separator 42 also receives the demodulated output signal from demodulator 40.

An exemplary sync separator is shown in FIG. 5. As shown, sync separator 42 may comprise a peak detector which receives the demodualted composite video signal. The detector is preferably set at a signal level between the maximum sync signal level and the highest expected level of the remaining composite video signal which in this case is the pre-sync and post-sync signal levels. The detector provides an output pulse only when the demodulated composite video signal is above this threshold level (level E FIG. 2g). If desired, more sophisticated sync separators which are capable of automatically maintaining an optimum threshold with respect to an incoming composite video signal over a wide signal amplitude range, in a manner well known in the art, may be used in place of the peak detector of FIG. 5.

The detected sync signals are distributed to the vertical and horizontal CRT drives and the blanking amplifier and function as a blanking signal during horizontal retrace, a reset signal for the horizontal ramp generator, and a gate signal which opens the current ramp of the vertical drive signal generator to provide the vertical increment during each sync period. The remote transceiver CRT beam will therefor be automatically driven in time spaced synchronism with the CRT bean which was used to acquire the original video information.

In the writing mode, the demodulated analog video signals are coupled to the CRT cathode. The detected video signals thus intensity modulate the CRT writing beam to provide a variable intensity writing beam which varies in intensity with the video information. A photoresponsive recording medium placed at the target 12 (FIG. 1) will be exposed to a beam of light generated by CRT 11 which is a function both in position and intensity of the graphic information density pattern of the original document. The original document will therefor be faithfully reproduced at the remote transceiver location.

In the exemplary transceiver apparatus described, both video signal acquisition and synthesis is effected by raster scanning a target surface upon which either the original document or the photoresponsive recording medium is located. The light beam generated by the moving spot on the CRT faceplate first passes through a lens system. It is, of course, desired to cause the beam to form a focused spot of light, at each point in the scan, upon the target surface. Most lenses, however, are designed to image from a planar to a planar surface. It would appear therefor that an acceptable approach would be to utilize a flat face CRT and, using a standard lens system, focus the CRT face upon a planar target surface. This technique, which has indeed been suggested by the prior art, has several disadvantages. First, flat faced CRTs are considerably more expensive than CRTs which have a shperical surface. Secondly, flat faced CRTs require dynamic focusing correction which increases the complexity of the beam position control electronics.

In accordance with an important feature of the present invention, the transceiver apparatus of FIG. 1 utilizes a conventional, commercially available, inexpensive spherical face CRT. It is theoretically possible to design a lens system capable of focusing the spherical CRT source upon a planar target surface. Such a lens system, however, would be complex and costly. Accordingly, a commercially available, inexpensive copy lens is utilized. To compensate for the fact that the spherical faceplate CRT presents a substantially spherical source configuration, it has been found that the target surface may be curved in accordance with the following considerations.

The spot on the CRT faceplate actually appears on the phosphor on the inside surface of the CRT faceplate. For a spherical faceplate CRT this surface typically has a concave spherical radius. The outside surface of the CRT faceplate is also spherical, but typically with a greater radius of curvature than the inside surface. As a consequence of this difference in radius, the glass thickness of the CRT faceplate normally increases from the center of the face to the outside edges.

Figure 6:
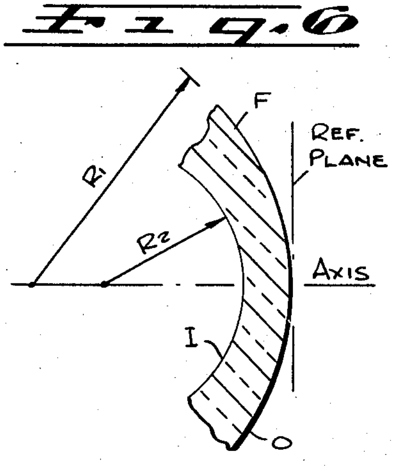
FIG. 6 is a partial sectional view of a portion of the faceplate of a spherical faceplate cathode ray tube.

A partial section of a typical CRT faceplate F having an outer surface radius $R_1$ and an inner surface radius $R_2$ is illustrated in FIG. 6. The first task in determining the required focus correction in accordance with the invention is to determine the effective optical radius of such a spherical faceplate CRT. To determine the effective radius ($R_e$), it is necessary to take into consideration both the outside and inside radii of curvature ($R_1$ and $R_2$) and the index of refraction and varying thickness of the faceplate glass. One particular CRT used in the apparatus of FIG. 1 has been a 21'' 70° CRT having an outer surface radius $R_1$ of 40'' and an inner surface radius $R_2$ of 32''. Within a high degree of accuracy, it has been found, that, except at the extremities of the faceplate, the effective source radius may be approximated using the formula:

$$R_e = (R_1+R_2)/2 \quad [1]$$

Accordingly, for the specific CRT utilized it has been found that the effective CRT source radius (where the raster does not approach the extremities of the plate) may be approximated with a high degree of accuracy by a spherical surface having a radius of curvature of 36''.

Knowing the equivalent source configuration, the next question to be answered is: What is the locus of focal points of the source at the target location? Analysis shows that the locus of focal points of a spherical surface imaged through a lens satisfying the criteria of the standard thin lens formula is not a sphere but rather takes the form of a surface section of an oblate spheriod. A document or a photosensitive medium cannot be bent so as to conform to the complex surface which defines the actual locus of focal points of the effective source configuration since most documents may generally be bent about only a single axis of curvature. Attempts to fold about more than one axis of curvature will seriously distort the graphic information recorded on the document. The inquiry, therefor, must be directed to selecting a target surface having but a single radius of curvature which can reasonably approximate the locus of focal points of the image of the equivalent source configuration within limits acceptable for facsimile or other purposes.

Figure 7:
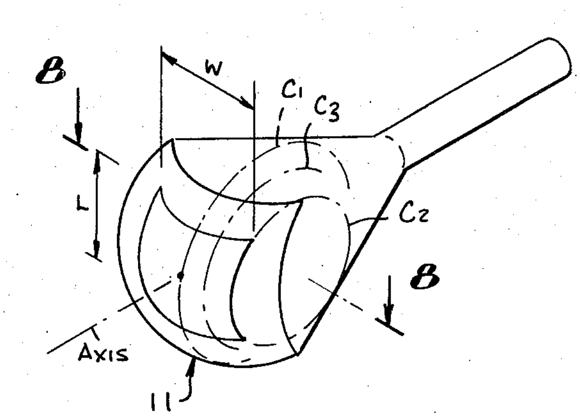
FIG. 7 is a perspective view of a spherical faceplate cathode ray tube and is useful in understanding the focus correction principles of the invention.

Referring now to FIG. 7, a perspective view of a spherical CRT 11 is illustrated. Superimposed on the surface of CRT 11 is a rectangular pattern indicating the boundaries of an exemplary raster scan having a scan length L and scan width W.

Compensation for the curvature of the spherical CRT source is limited to providing a target surface having a radius of curvature about only a single axis. It is to be anticipated that the length dimension L (which is normally greater than the width dimension W) will require the major component of compensation, the required length compensation curvature (of the target surface) will be computed not at the central axis but at some point between the central axis and the extremity of the width dimension. In effect, this achieves an approximate correction for focal distance variations as the horizontal scan proceeds from one extremity of the width dimension to the opposite extremity. In practice, the point selected for computing the length (vertical) compensation is preferably chosen to be halfway between the central axis and either extremity of the scan width dimension.

Figure 8:
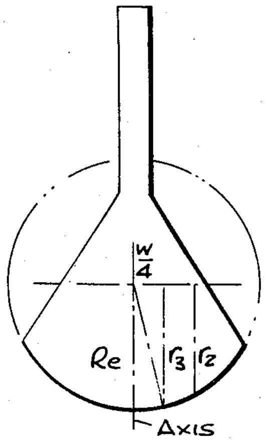
FIG. 8 is a sectional view taken along the line 8—8 of FIG. 7.

Thus, if the equivalent spherical radius ($R_e$) of CRT 11 generates a major axis circle slice $c_1$ of the sphere surface (FIG. 7) and if a circle slice taken at the extremity of the width dimension of the raster generates a circle slice $c_2$ of radius $r_2$, a circle slice taken at the distance halfway between circle slice $c_1$ and circle slice $c_2$ will generate a circle slice $c_3$ having a radius $r_3$. FIG. 8 shows the relationship of the off axis radius $r_3$ of circle slice $c_3$. Thus, for a CRT having an equivalent spherical radius $R_e$ and a scan width dimension W, the selected off axial radius $r_3$ may be computed by use of the formula $$r_3 = \sqrt{R_e^2-(W/4)^2} \quad [2]$$

Figure 9:
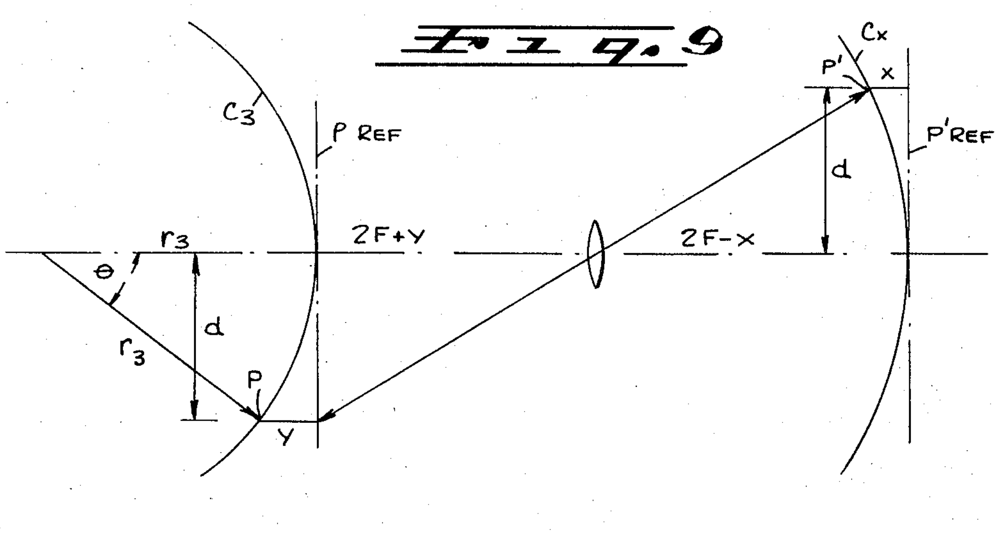
FIG. 9 diagramatically illustrates the aspect of determining the locus of focal points of a light source imaged through a lens at a target location in accordance with the principles of the invention.

Referring now to FIG. 9, the procedure for determining the locus of focal points of the compromise circle slice $c_3$ is illustrated. At the left of FIG. 9 is the equivalent circular section of circle $c_3$ with an offset Y at a distance $d$ from the axis. Lens 13 is placed at the midpoint between the reference planes $P_{ref}$ and $P'_{ref}$ (for a 1:1 perspective). On the right is some curved surface $C_x$ defined by offset X, whose form we wish to determine. Letting P be an object point on the circle slice $c_3$, the distance from object to lens is 2F±Y and the distance to point P' on the image surface to be determined is 2F–X. The standard thin lens formula measures all distances on the axis and, for points off the axis, it is customarily assumed that the formula also applies with distances treated as though they were along the axis. The thin lens formula may be written (for a 1:1 perspective):

$$1/F=[1/(2F\pm Y)]+[1/(2F-X)] \quad [3]$$

solving for x:

$$X=FY/(F+Y) \quad [4]$$

Figure 10:
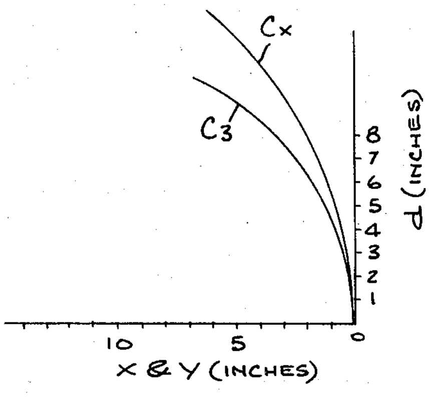
FIG. 10 is a plot of the image surface shape at the target location of a spherical light source section.

FIG. 10 shows a typical plot of the effective source $c_3$ and locus of image focal points $c_x$ for a 21 inch spherical CRT with an equivalent source radius of 36 inches, a distance from reference plane to lens of 16 inches (equal to 2F) and a scan width W equal to 8½ inches. It will be noted that the curve of the locus of focal points $c_x$ follows the effective compromise source shape $c_3$ quite closely until about five or six inches off the optical axis.

A reasonable approximation for the target configuration therefor is to select the radius of curvature of the target surface to be approximately the same as the radius of the effective source circle slice $c_3$ where the scan length is not substantially greater than 10 or 12 inches. If a greater scan length is desired, analysis would indicate that a surface having somewhat greater radius of curvature than that of the circle slice $c_3$ should be chosen.

The determination of the target surface curvature in a manner as above indicated could be made for each circle slice along the width of the scan. The actual locus of focal points of the effective CRT spherical surface would be in the form of a section of an oblate spheriod as above indicated. Such a surface would be too complex for facsimile purposes for the reasons given. The method above described shows that a compromise radius ($r_3$) may be selected off the center radius and in the long axis of the pattern on the CRT surface.

The selection of the compromise target surface configuration takes advantage of the depth of focus available in conventional copy lenses. The above method shows that a target surface configured so as to form the surface of a cylinder with a determined curvature ($r_3$) in the length dimension of the scan provides adequate correction for focal errors in the system of the present invention where the equivalent source presents a largely spherical configuration. The principles discussed are not limited, of course, to any particular source configuration.

The principles employed for achieving light detection are an important aspect of the invention and will now be discussed having reference to FIG. 1 and, more particularly, to FIGS. 11 through 13. As will be appreciated from the preceding discussion, a stationary target surface is employed which is raster scanned utilizing a CRT (or equivalent) light source. Thus, neither mechnical motion of a "transducer" or of the document or photoresponsive recording medium is required. This is an important distinction from the prior art CRT systems wherein typically either the original or a reduced size intermediate is moved incrementally past a scanning axis. Incremental mechanical motion, of course, presents inherent start and stop time lags and high peak mechanical forces.

In the present invention, the target area is preferably stationary. Data acquisition and synthesis is achieved by CRT two axis scanning wherein scanning velocities in both vertical and horizontal axes are programmable and can, for all practical purposes, be changed instantaneously during transmission and recording. Unlike mechanical systems wherein motion of the medium on which the graphic information is recorded is required therefor, three dimensional objects such as coins, circuit boards, etc., may be accommodated.

Attempting to "read" a stationary surface on which a real size document or the like is positioned and which presents a large surface area to be scanned presents various problems which have not heretofor been solved. In the system described, video signal acquisition is achieved by directing a flying spot of light onto the document original located at the target surface and measuring an appropriate reflected energy characteristic so as to develop a video signal which is a function of the image density at each point on the surface of the document. No prior art CRT system has solved the problem of two axis scanning a large stationary surface area and, with sufficient accuracy, measuring the image density at each point on the surface of the document. In accordance with an important feature of the invention, this problem has been solved.

Figure 11:
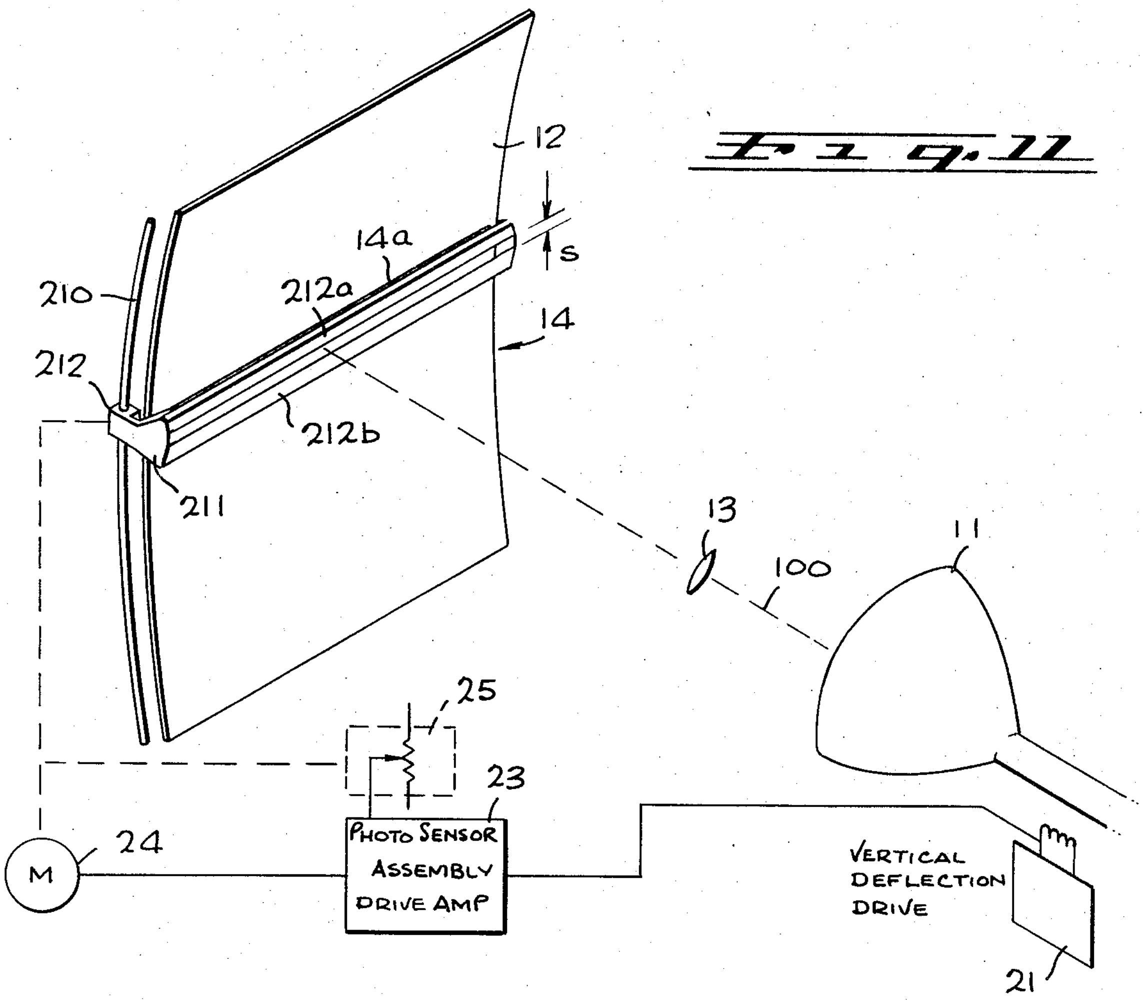
FIG. 11 is a simplified diagramatic view and block diagram of a preferred form of light detection apparatus including photosensor carriage position control apparatus constructed in accordance with the principles of the invention.

Referring now to FIG. 11, the light detection apparatus of FIG. 1 is illustrated in greater detail. FIGS. 12 and 13 are simplified side views of the embodiment of FIG. 11 and illustrate the light detection considerations at two vertical positions in a scan. As shown, CRT 11 directs a spot of light defined by beam 100, via lens 13, onto the surface of target 12 upon which a document (not shown) may be positioned by any suitable means. In accordance with the principles previously described, target surface 12 preferably defines the partial surface of a cylinder having a determined radius of curvature.

Positioned adjacent target surface 12 is a photosensor assembly 14 which includes spaced elongated sensor mounts 212*a* and 212b upon which are mounted, respectively, a pair of elongated light sensitive elements 14*a* and 14*b*. Elements 14*a* and 14*b* preferably have an effective length sufficient to traverse the entire width of the target surface 12. They are spaced from each other by a distance S sufficient to enable passage of the scanning spot therebetween. Photosensors 14*a* and 14*b* may, for example, be elongated sensor strips having an elongated photosensitive surface. One type of suitable photosensor is available under the "Longline Series" of the United Detector Technology Company and described in the technical bulletin of the aforementioned company entitled "Shottky Barrier Standard and Longline Series".

The elongated photosensor mounts 212*a*, and 212*b* are attached via a mounting bracket 211 to a carriage 212. Carriage 212 is adapted to be vertically movable with respect to the target surface 12 along a path defined by track 210. Track 210 is preferably configured to allow travel of the assembly 14 along a path which is substantially congruent to the surface defined by target 12. Thus, where target 12 defines a portion of a cylindrical surface track 210 defines a circular arc portion concentric with the axis of target surface 12.

Carriage 212 is movable (FIG. 11) by means of any suitable linkage (not shown) driven by a drive motor 24. Drive motor 24 is controlled by a photosensor assembly drive servoamplifier 23 which receives as one input the output of the vertical CRT yoke deflection drive 21. The other input to photosensors assembly drive amplifier 23 is an error signal received from follow-up potentiometer 25. Potentiometer 25 is coupled by any suitable linkage so as to provide an output signal which is a function of the actual position of carriage 212. Drive amplifier 23 thus provides appropriate drive signals to motor 24 to drive carriage 212 so as to maintain assembly 14 in vertical synchronism with the scanning spot emitted from CRT 11.

Figure 12:
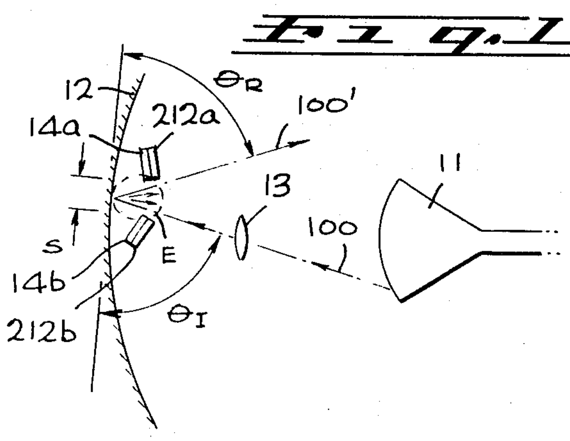
FIG. 12 is a simplified side view of the embodiment of FIG. 10 illustrating light detection during an exemplary scan in the upper vertical portion of the target surface.
Figure 13:
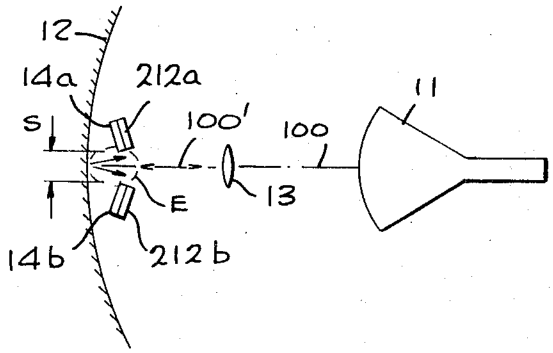
FIG. 13 is a simplified side view of the embodiment of FIG. 10 illustrating light detection during an exemplary scan at the vertical center portion of the target surface.

The principle of operation of sensor assembly 14 juxtaposed to target surface 12 may best be understood having reference to FIGS. 12 and 13. Referring now to FIG. 12, a simplified side view of the apparatus of FIG. 11 illustrates a beam of light 100 impinging upon target surface 12 at point I in the upper vertical portion of impingment 12. As shown, beam 100 impinges upon the surface of target 12 at an angle $\theta$ defined by the tangent to the surface 12 at the point of impingement I. The spectral reflection of beam 100, as illustrated by beam 100′, has an angle of reflection $\theta_r = \theta_i$.

Spectral reflection is the reflection generated primarily as a function of the surface finish of a document portion located at point I. Ray 100′ should, therefor, be avoided by a photosensitive detection scheme since it represents an error signal as far as image density at point I is concerned. Diffuse reflection, on the other hand, is representative of the density of an image located at the target surface 12. Such diffuse reflection is schematically illustrated in FIGS. 12 and 13 by an energy lobe E having primary components adjacent the axis of reflected ray 100′.

Referring to FIG. 12 in greater detail, photosensors 14*a* and 14*b* are spaced apart a distance S so as to enable the impinging and reflected beams 100 and 100′ to pass therebetween. Obvious trigonometric calculations can be performed taking into account the distances involved and the angle of incidence at the extremes of the target surface 12 to determine the minimum separation S required between the photosensors to assure that the photosensor assembly will not intersect either the incident beam 100 or the reflect beam 100′.

When a scan is directed in the upper portion of target plane 12, as illustrated in FIG. 12, the diffuse energy lobe E representing the image density information will be primarily intercepted by photosensor 14*a*. When the scan is approximately at the vertical center of target surface 12, as shown in FIG. 13, the diffuse energy lobe E will be intercepted approximately equally by sensor elements 14*a* and 14*b*. As will appear upon consideration, when the scan is in the lower vertical portion of target surface 12, the diffuse energy lobe E will be primarily intercepted by photosensor element 14b.

To provide a constant signal amplitude for a constant density lying in the vertical axis of target surface 12, the signals from both sensor elements 14*a* and 14*b* are preferably summed. The summing of the sensor outputs result in a high level of tolerance to the changing angle of incidence as the photosensor assembly 14 carried by carriage 212 traverses the target surface 12 in the vertical direction. The form factor of the sensors 14*a* and 14*b* are long in the horizontal axis and preferably extends to at least the entire width of target surface 12. This form factor allows even light detection of the diffuse reflection as the angle of incidence changes horizontally.

The light detection principle above described assures that there will be a constant signal from a constant density image portion from all points of a large surface area image located at the target surface. The disclosed approach also allows the photosensors to be close to the reflecting target surface at all points in the scan. Superior signal to noise ratios to that achieveable by prior art methods are therefor available. Further, the CRT beam currents may be kept lower than in prior art methods which increases the CRT phosphor life.

While the above described preferred embodiment utilizes a pair of photosensor elements which are summatively connected obviously other structures are acceptable within the broad teachings of the light detection concepts discussed. For example, a single elongated photosensor element may be utilized. To maintain the single element properly oriented to intercept the non-spectral reflection at each point in the scan, the sensor mounting means may contain provisions for varying the angle of the sensors sensitive surface with respect to the target surface 12 as the element moves across the vertical target surface dimension. As a further alternate structure one of the photosensitive elements may be replaced with a mirror or the like angled to focus the intercepted non-spectral reflection upon the remaining sensor element. It is not, of course, necessary for purposes of light detection to have a target surface of the general form indicated in FIG. 11. The light detection scheme disclosed encompasses tracking means which may enable suitably formed sensors to follow conforming paths in connection with any shape of target surface. Further, horizontal as well as vertical sensor motion to retain any desired sensor configuration in physical proximity to a progressing scan may be utilized.

Figure 14:
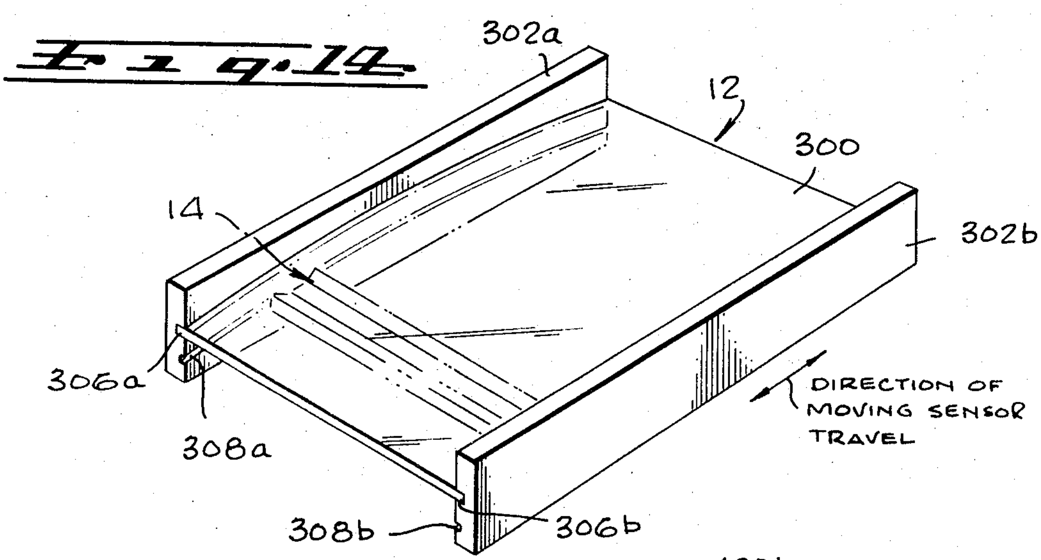
FIG. 14 is a perspective view of an alternate preferred form of a target assembly and photosensing carriage assembly constructed in accordance with the principles of the invention.
Figures 15, 16:
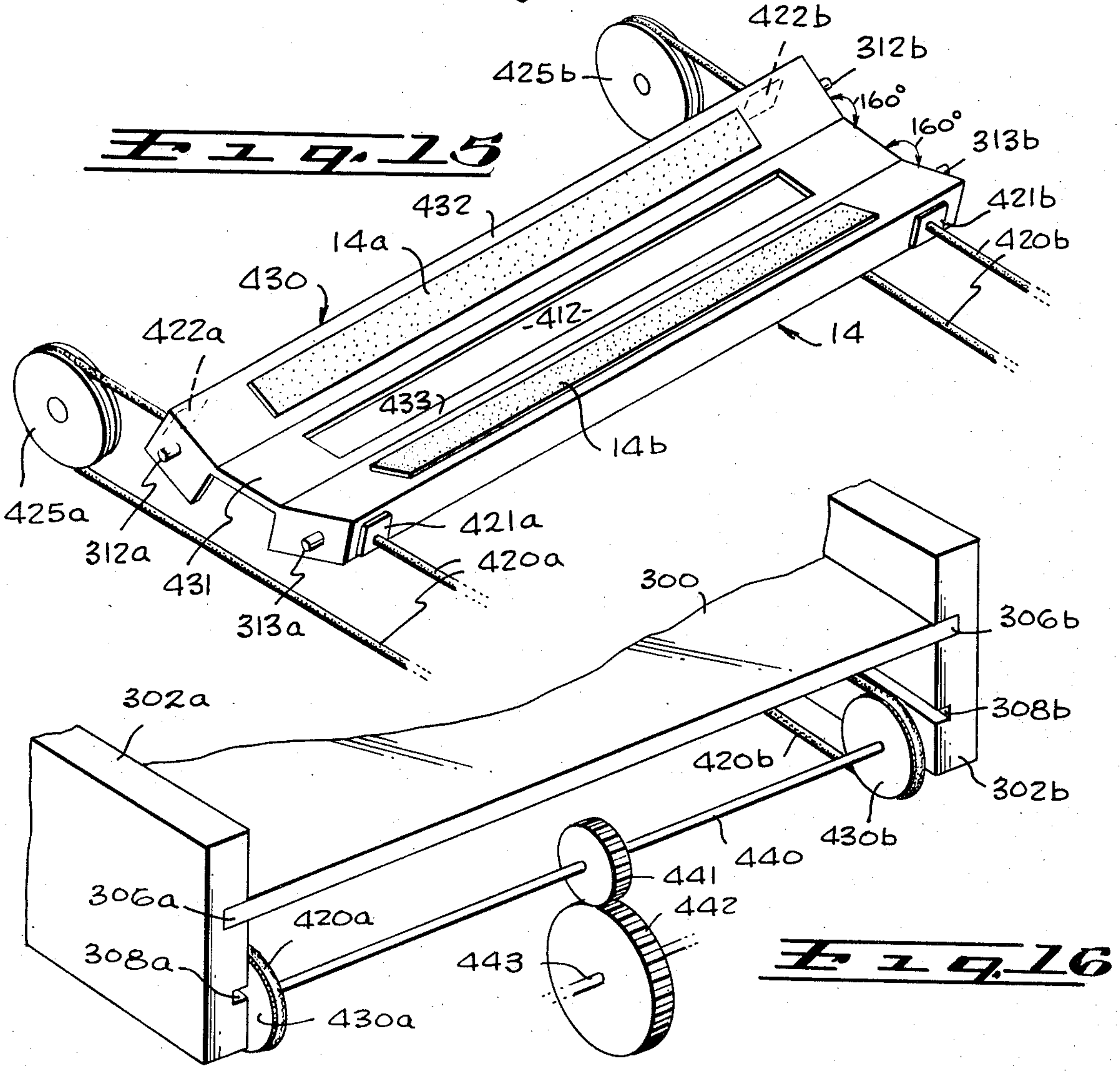
FIG. 15 is an expanded perspective view of the photosensor carriage assembly of FIG. 14 constructed in accordance with the principles of the invention.
FIG. 16 is an enlarged perspective view of a portion of the target assembly illustrating a preferred arrangement for driving the photosensor carriage.

Referring now to FIGS. 14 through 16, an alternate preferred embodiment for the target and sensor carriage is illustrated. As shown, target surface 12 is defined by the surface of glass platen 300. Platen 300 is preferably configured, as previously described, to define a partial cylindrical surface having a determined radius of curvature. The platen is mounted between side mount members 302*a* and 302*b*. Mounting is effected by inserting the opposed edges of platen 300 within curved grooves 306*a* and 306*b* formed in the interior surfaces of members 302*a* and 302*b*.

A second pair of grooves 308*a* and 308*b* are also formed in the interior surfaces of side mount members 302*a* and 302*b*. Grooves 308*a* and 308*b* preferably define a curved guideway which is concentric with slots 306*a* and 306*b* and thus define a guide path which is congruent to the surface of glass platen 300. A sensor carriage assembly 430 is provided with a pair of guideway pins 312*a* and 313*a* positioned at one end thereof and a pair of opposed guideway pins 312*b* and 313*b* positioned at the opposed end thereof. The pins 312*a*, 313*a* and 312*b*, 313*b* are adapted to be inserted in grooves 308*a* and 308*b*, respectively. The guide pins when moved through slots 308*a* and 308*b* will cause carriage assembly 430 to follow the curve defined by grooves 308*a*, 308*b*.

Carriage 430 has a central body portion 431 within which an elongated aperture 412 is formed. The width of aperture 412 is selected so as to allow the incident spectral and reflected light beams of the interrogating CRT to pass through the aperture without being intercepted by any portions of the assembly. Central body portion 431 connects opposed side portions 432, 433 of carriage 430. As shown, the carriage side portions 432, 433 are angularly related to the central body portion 431. In the embodiment of FIG. 15, each side portion forms an exemplary angle of 160° with the central body portion.

An elongated photosensor element 14*a* is mounted upon carriage side portion 432 adjacent the central aperture 412. In like manner, an opposed photosensitive element 14*b* is mounted upon the side carriage portion 433 which is adjacent to the carriage aperture 412.

A pair of drive belt attachment mounts 421*a* and 422*a* are positioned at one end of carriage 430. An opposed pair of drive belt mounts 421*b* and 422*b* are positioned at the other end of carriage 430. The drive belt mounts are adapted to be attached to a pair of drive belts 420*a* and 420*b* to enable the carriage 414 to be driven along grooves 308*a* and 308*b*.

The exemplary drive mechanism is best seen in FIG. 16. As shown, drive shaft 443, which is connected to servo motor 24 (not shown), drives main drive gear 442. Gear 442 via coupling gear 441 and coupling drive shaft 440 drive a pair of belt drive members 430*a* and 430*b* upon which belts 420*a* and 420*b* are positioned. Rotation of the drive gears will cause carriage assembly 14 to move through the curve defined by grooves 308*a* and 308*b*.

A document or other object containing graphic information may thus be placed on platen 300. The CRT beam will pass through the aperture 412 of sensor assembly 14 and the non-spectral reflection from the document will be intercepted by one or both of the sensor elements 14*a*, 14*b*. The sensor assembly 14, as above described, is caused to be driven in synchronism with the vertical position of the CRT beam. Although exemplary photosensor assembly and drive structures have been illustrated and suggested many other suitable mechanical and physical configurations are adaptable for use in accordance with the broad teachings of the invention.

In facsimile production it is, of course, essential that the reproduced image duplicate the original copy in proportions and geometric relationships. If the lens of the optical system has no distortions (e.g. pincushion or barrel) and the spot portion of the cathode ray tube is exactly proportioned to the yoke current in both transmitter and receiver then, assuming no information distortion in either data acquisition, transmission, or reception, the received picture will be identical to the original copy. If the transmitter lens and yoke are not perfect, then the CRT pattern in the receiver will not be identical to the copy, but may display, for example, barrel or pincushion distortion. However, if the lens and yoke in the receiver have the same geometric imperfections as those in the transmitter, the distorted CTR pattern in the receiver will be converted to a final image with no distortion. Thus, by matching imperfect lens, yoke and other pertinent operating parameters, distortion may be eliminated, as described in more detail in the following discussion.

Lenses, particularly those of large aperture and wide angle, may produce geometric distortion in their images. For example, the image of a rectangular grid may be wider at the middle than at the ends, creating "barrel" distortion, or, conversely, may be narrower in the middle, creating "pincushion" distortion.

The deflection yokes used on available, inexpensive CRTs also produce variations in scan deflection so that the spot position is not linearly proportional to the yoke current. If the signal generated by a flying spot scanner CRT with such a non-ideal yoke is applied to a receiver CRT with a distortionless yoke (or vice versa) distortion will be produced in the received image.

If minimum overall distortion is required, one may proceed in either of two ways. First, a "perfect" distortionless yoke may be used in both the transmitter and receiver, so that the scanning spot in the transmitter moves with uniformity across the copy to be transmitted, and the spot in the receiver is precisely synchronous in position with that of the transmitter. Also, lenses free from geometric distortion must be used both in the transmitter and receiver.

"Perfect" yokes and distortionless lenses are difficult to achieve and lead to hardware complexity and expense. In accordance with an important aspect of the present invention, we have found an inexpensive approach to producing a received picture substantially identical to the original copy. In our approach, an imperfect lens which produces distortion is used. However, matched lenses are used in both the transmitter and receiver. We also use imperfect yokes. However, matched yokes in transmitter, and receiver having similar distortion characteristics are used. With such matched imperfect components, the flying spot in the transmitter, and the spot focused on the recording medium in the receiver will always be at equivalent points, even though spot movement on the surface of the CRTs and transmission of the light beams through the lenses are subject to non-linearities and distortion. Put another way, a rectangular grid on the original copy might be represented by a grid with barrel distortion on the receiver CRT, but this image would be reshaped back into the original grid by the receiver lens. Looking at the matter from the viewpoint of the mechanics of the facsimile system, we may say that the scanning electron beam may not move uniformly on the transmitter CRT because of yoke deficiencies. Further, the scanning light spot imaged on the copy in the transmitter may move differently from the point on the CRT due to lens distortion. If, however, the yoke in the receiver has the same errors, it will interpret the yoke currents just as was done in the transmitter so that the receiver spot is always at a position corresponding to the transmitter spot, both having equal, non-uniform motion. Finally, if the lens in the receiver has the same distortions as that in the transmitter, it will reshape the distorted position on the CRT into the original rectangular grid form.

While the realization of electro-optical compensation of image distortion such as by the deliberate selection of matched electrical and optical components to achieve overall cancellation is the most desirable, it should be understood by those skilled in the art that some deviation may be permitted where high facsimile fidelity is not required. It will be further understood that the distortion compensation feature of the present invention is achieveable because the system disclosed allows use of the same hardware components (i.e., CRTs, yokes, lenses), both for data acquisition and synthesis. Therefor, transmission and reception devices of this invention preferably involved matched hardware components to obtain high quality facsimile copy using individually inexpensive hardware components.

While the present invention has been described primarily in the context of a facsimile system, it will be apparent that other systems can usefully employ the invention. For example, character recognition, comparison, or other system requiring high quality, video information functionally related to graphic indicia may make use of the principles of the invention disclosed. Further systems werein control or other signals are transmitted over a low quality communication link will also find the principles of the invention useful.

Accordingly, the scope of the invention should be limited only by the scope of the appended claims.

We claim:

1. A flying spot scanning system for reading a graphic image contained on a motionless medium, said system comprising:

means for generating and sequentially scanning a spot of substantially constant intensity radiant energy over the surface of the medium to be read;

radiant energy sensitive means disposed in proximity to the medium to intercept the radiant energy as modified by the image for producing an output signal functionally related to the image; and transport means coupled to said radiant energy sensitive means for moving said radiant energy sensitive means in synchronism with at least one motion component of said scanning spot, whereby said radiant energy sensitive means is caused to be positioned in close physical proximity with said scanning spot throughout a scan to assure that the output signal is uniformly related to the image.

2. The system of claim 1 wherein said generating and scanning means comprises a cathode ray tube flying spot scanner means having a controllable beam intensity for sweeping a substantially constant intensity spot of light across the medium in a sequential line by line raster manner, and said radiant energy sensitive means comprises a photosensitive means disposed to intercept the illumination as modified by the image on the medium for providing an analogue video output signal functionally related to the graphic image.

3. The system of claim 2 wherein said cathode ray tube flying spot scanner means comprises:

a cathode ray tube;

vertical beam deflection drive means for deflecting the cathode ray tube beam along a vertical axis; and horizontal beam deflection drive means for deflecting the cathode ray tube beam along a horizontal axis, said vertical and horizontal beam deflection drive means being adapted to cause said cathode ray tube to generate a series of sequential, vertically spaced, horizontal line scans.

4. The system of claim 3 wherein said transport means comprises means for moving said photosensitive means in synchronism with the vertical position of the cathode ray tube generated spot of light.

5. The system of claim 4 wherein said last named means comprises servo means responsive to and controlled by the vertical beam deflection drive means for moving said photosensitive means in synchronism with the vertical position of the cathode ray tube generated spot of light.

6. The system of claim 5 wherein said photosensitive means comprises at least one photosensor having an elongated surface, the length dimension of said surface extending in the direction of said horizontal axis.

7. The system of claim 6 wherein said transport means includes a photosensor support mechanism adapted to position said photosensor, at each portion of a scan, so as to have said photosensitive surface intercept the diffuse reflection from the medium surface.

8. The system of claim 7 wherein said photosensor support mechanism comprises:

means for pivotally supporting said elongated photosensor about an axis extending in the direction of the photosensor; and means for rotating said photosensor about said pivotally supporting means as the sensor changes its vertical position to cause said photosensitive surface to assume a predetermined angular relationship with the surface of the medium functionally related to the vertical position of the sensor, whereby the photosensitive surface will, at each point in the scan, present an optimum positional relationship with the medium surface to intercept the diffuse reflection from the medium surface.

9. The system of claim 6 wherein said photosensitive means further comprises a second photosensor spaced from said at least one photosensor and having an elongated photosensitive surface spaced from and parallel to said photosensitive surface of said at least one photosensor, said scanning spot being projected through the space between said spaced photosensor.

10. The system of claim 9 wherein said spaced photosensors are angularly positioned with respect to the surface of the medium so that the photosensitive surface of at least one of said photosensors intercepts the diffuse reflection from the medium surface at each point in a scan.

11. The system of claim 1 wherein said generating and scanning means comprises:

a spherical faceplate cathode ray tube having an effective light source configuration approximated by a sphere segment of determinable radius;

medium support means juxtaposed to said cathode ray tube for defining a target surface, said support means including means to fixedly support the medium upon said target surface.

12. The system of claim 11 wherein said target surface defines a non-planar surface having at least one axis of curvature.

13. The system of claim 12 wherein said scanning means further comprises means for deflecting the cathode ray tube means to cause said beam to generate a series of sequential, vertically spaced, horizontal line scans defining a raster having a determined overall length and width dimension, said length dimension being greater than said width dimension.

14. The system of claim 13 wherein said target surface has an axis of curvature parallel to said width dimension and a radius of curvature functionally related to said effective light source configuration determinable radius, said target surface defining a partial cylindrical surface concave towards said cathode ray tube, said curved target surface providing an approximate compensation for the difference in optical path length of the cathode ray tube beam at different points in a scan.

15. The system of claim 14 wherein said transport means includes means for moving said radiant energy senstive means along a preselected surface congruent to said target surface whereby said radiant energy sensitive means will be positioned a preselected constant distance from said target surface at all points in a scan.

16. In a facsimile graphic indicia communication system for transmitting composite video signals representative of a graphic image contained on a medium to a location remote from said medium utilizing a narrow band communication link, the combination comprising:

scanning means operative to sequentially scan incremental areas of the medium along a predetermined raster for generating an electrical video signal functionally related to the graphic image;

position signal generating means for generating synchronizing signal pulses of variable preselected durations, said pulses being functionally related to the position of said scan with respect to the medium;

modulator means responsive to said scanning means and said position signal generating means for generating a modulated output signal, said modulated output signal varying between first and second signal levels as said video signal varies between levels corresponding to white and black portions of the image, said modulated signal having a third signal level during the sync period defined by the duration of each synchronizing pulse, said modulator means including narrow band communication link signal conditioning means for conditioning the modulated output signal to enhance the accurate detection, at locations along the communication link remote from the modulator means, of the initiation, termination and duration of each sync period, said signal conditioning means comprising means for generating pre-sync signals immediately preceeding each sync period, said pre-sync signals being at a fourth signal level and having a predetermined phase relationship with respect to said synchronizing pulses;

means for generating post-sync signals immediately following said sync period, said post-sync signals being at said fourth signal level and having a predetermined phase relationship with respect to said synchronizing pulses, said fourth signal level being different from said third signal level by a preselected signal level difference whereby delays and distortions in the transmitted modulated output signal introduced by the narrow band communication link will be minimized and controlled with respect to the initiation and termination of the sync period to allow accurate detection thereof; and coupling means for coupling the modulated output signal to the communication link for transmission by the link.

17. The system of claim 16 further comprising:

synthesizing means remotely located along the communication link from said coupling means for reproducing the graphic image from said modulated output signal; and second coupling means for coupling the transmitted modulated output signal to said synthesizing means.

18. The system of claim 17 wherein said modulator means is a frequency modulator, said modulated signal varying between first and second frequencies corresponding to white and black portions of the image, said modulated signal being a third frequency during said sync period, said modulated signal being a fourth frequency during said pre-sync and post-sync periods, said fourth frequency being different from said third frequency by a preselected frequency difference.

19. The system of claim 18 wherein the transition from pre-sync to sync and sync to post-sync frequencies occurs at zero crossovers of the modulated output signal.

20. The system of claim 19 wherein the communication link is a standard commercial telephone line, said first, second, third and fourth frequencies being within the bandwidth of said commercial telephone line.

21. The system of claim 20 wherein said scanning means comprises:

a cathode ray tube flying spot scanner means having a controllable beam intensity for sweeping a substantially constant intensity spot of light across the medium in a sequential line by line raster manner; and photosensitive means disposed to intercept the illumination as modified by the image on the medium for providing an analogue video output signal functionally related to the graphic image.

22. The system of claim 21 wherein said cathode ray tube flying spot scanner means includes vertical and horizontal beam deflection drive means, said vertical drive means including means to vertically increment the cathode ray tube beam at a selected rate during each sync period whereby the vertical resolution of the system is defined by the duration of the sync period.

23. The system of claim 22 wherein said synthesizing means comprises:

demodulating means receiving said transmitted modulated output signal from said second coupling means for demodulating said modulated output signal to provide a demodulated video signal varying between first and second analogue signal levels functionally related to the white and black portions of the image and a third analogue signal level functionally related to said synchronizing pulses;

sync signal separator means for separating the demodulated video signal from the demodulated synchronizing pulses; and reproducing means controlled by said demodulated video signal and said demodulated synchronizing pulses for reproducing the original graphic image.

24. The apparatus of claim 23 wherein said reproducing means comprises:

a light responsive recording medium;

a second cathode ray tube flying spot scanner means having a controllable beam intensity for sweeping a spot of light across said light responsive recording medium in a sequential line by line raster manner.

25. The apparatus of claim 24 wherein said second cathode ray tube flying spot scanner means includes second vertical and horizontal beam deflection drive means, said second vertical drive means including means to vertically increment the cathode ray tube beam during the time of occurrence and under the control of the demodulated synchronizing pulses, said second scanner means having beam intensity control means controlled by the demodulated video signal, whereby the graphic image will be reproduced on the light responsive medium with a vertical resolution identical to that of the first mentioned scanning means as controlled and slaved by the synchronizing pulse width.

26. In the transmission and reception of graphic images utilizing spaced transceiver devices coupled by a communication link, each transceiver including a cathode ray tube flying spot scanner having vertical and horizontal deflection yokes, said cathode ray tube flying spot scanner being adapted to generate a controllable beam for sweeping a spot of light across a target surface in accordance with a predetermined raster pattern controlled by deflection signals applied to the deflection yokes, the improvement which comprises using matched non-ideal cathode ray tubes in said transceiver devices including matched non-ideal deflection yokes having similar performance characteristics for compensating for non-linearities introduced by each component.

27. The system in accordance with claim 26 wherein, in each transceiver, the cathode ray tube light beam is focused on the target surface by a lens system, the further improvement which comprises using matched non-ideal lens systems in said transceiver devices said matched non-ideal lens system having similar performance characteristics for compensating for distortion introduced by each lens system.

28. In the acquisition, transmission, reception and synthesis of graphic information utilizing transceivers including a cathode ray tube flying spot scanner having vertical and horizontal deflection yokes for causing a spot of light focused by an associated lens assembly to sweep across a target surface in accordance with a pattern defined by one transceiver operating in a data acquisition and transmission mode which pattern it is desired to accurately reproduce in a selected transceiver operating in a data reception and synthesis mode, the improvement which comprises using matched cathode ray tube deflection yoke, and lens assembly non-ideal components in said transceivers to compensate for the non-linearities and distortion introduced by said components.

29. Apparatus for acquiring video signals functionally related to graphic indicia contained on a document, said apparatus comprising:

means for generating and scanning a beam of selectively directable light with at least two axes of freedom to cause said beam to intercept, in scanning relationship, an area of a target surface having length and width dimensions along said axes juxtaposed to said light generating means, said light generating means being substantially defined by a spherical light emitting surface having a determinable effective radius of curvature;

a lens assembly having a predetermined focal length for focusing said beam at a locus of focal points functionally related to the lens assembly parameters and said light beam generating means effective configuration; and target surface defining means juxtaposed to said light beam generating means for fixedly retaining the document in conformance with the target surface, said target surface defining means defining a non-planar surface having a radius of curvature about an axis parallel to one of said axes to define a non-planar surface approximating the surface defined by the locus of focal points of the scanning beam, said target surface radius of curvature being functionally related to the effective radius of curvature of the spherical surface, one of said length and width dimensions and the optical reduction of said apparatus.

30. The apparatus of claim 29 wherein said light beam generating and scanning means comprises a cathode ray tube flying spot scanner including a spherical faceplate cathode ray tube light source having an effective light source configuration defined by a sphere segment of determinable radius $r_e$, said target surface having a radius of curvature functionally related to said determinable radius $r_e$.

31. In a device for the transmission and reception of visual images over a communication link comprising raster scanning a target area with the scanning spot of a cathode ray tube the combination of: a cathode ray tube adapted to selectively impinge a spot on a target area; support means defining a target area for supporting a target thereon; and photosensitive means movably supported adjacent said target area and adapted for movement with respect to said target and being synchronously moved with said spot.

32. The device of claim 31 wherein said photosensitive means comprises at least one light-sensitive element adjacent said target area.

33. The device of claim 32 wherein said at least one light-sensitive element has elongated photosensitve surface which is positioned to transversely span said target area and is mounted for vertical movement with respect to said target area.

34. The device of claim 33 wherein said at least one light-sensitive element is mounted on a carriage member whose path of travel conforms to said target area.

35. The device of claim 34 which includes a second elongated light-sensitive element juxtapositioned in parallel, spaced relationship to said at least one light-sensitive element for movement therewith and wherein said target area configuration is defined by a support member adapted to selectively receive either a medium containing graphic information or a photosensitive recording medium.

36. The device of claim 35 wherein said carriage member is mounted on lateral track members defining a path of substantial congruency to the surface formed by said support member.

37. The device of claim 36 wherein said cathode ray tube has a spherical faceplate and said target area is vertically concave in configuration having a radius of curvature functionally related to the radius of curvature of said cathode ray tube faceplate.

38. The apparatus of claim 30 wherein the area of said target surface intercepted by said scanning beam has a length dimension (L) which is greater than the width dimension (W) and wherein the radius of curvature ($r_t$) of said non-planar target surface is about an axis parallel to said width dimension.

39. The apparatus of claim 38 wherein said apparatus has an optical reduction factor $O_r$ and the radius of curvature of said non-planar target surface is substantially in accordance with the formula:

$$r_c = (\sqrt{r_e^2 - (W/4)^2})(O_r)$$

* * * * *

Sheet 1

UNITED STATES PATENT OFFICE

CERTIFICATE OF CORRECTION

Patent No. 3,843,839 Dated October 22, 1974

Inventor(s) John S. Campbell et al.

It is certified that error appears in the above-identified patent and that said Letters Patent are hereby corrected as shown below:

Column 2, line 13, delete "is" and insert --are--;
Column 5, line 29, delete "containg" and insert --containing--;
Column 5, line 60, delete "transeiver" and insert --transceiver--;
Column 7, line 55, delete "207" and insert --208--;
Column 9, line 18, delete "42" and insert --43--;
Column 9, line 48, delete "preferable" and insert --preferably--
Column 11, line 21, delete "not" and insert --now--;
Column 11, line 27, delete "mosulator" and indert --modulator--;
Column 12, line 5, delete "synchorinized" and insert --synchronized--;
Column 12, line 14, delete "an" and insert --a--;
Column 12, line 16, delete "strob" and insert --strobe--;
Column 12, line 49, delete "The" and insert --the--;
Column 12, line 66, delete "tim" and insert --time--;
Column 13, line 21, insert --" "-- about the letter R;
Column 13, line 25, delete "200" and insert --208--;
Column 13, line 42, delete "200" and insert --208--;
Column 14, line 37, delete "shperical" and insert --spherical--;
Column 15, line 9, delete "," after "found";
Column 16, line 16, delete "2F±Y" and insert --2F+Y--;
Column 21, line 4, delete "CTR" and insert --CRT--;
Column 22, line 23, delete "werein" and insert --wherein--;
Column 23, line 44 (claim 9, line 7), delete"photosensor" and insert --photosensors--;

(continued on Sheet 2)

UNITED STATES PATENT OFFICE

CERTIFICATE OF CORRECTION

Patent No. 3,843,839 Dated October 22, 1974

Inventor(s) John S. Campbell, et al.

It is certified that error appears in the above-identified patent and that said Letters Patent are hereby corrected as shown below:

(Continued from Sheet 1)

Column 24, line 15 (Claim 15, line 3), delete "senstive" and insert --sensitive--;
Column 26, line 45 (Claim 28, line 2), after "transceivers", insert --interconnected by a communication link, each transceiver--;
Column 27, line 27 (Claim 30, line 6), after "surface", insert --defining means defining a partial cylindrical surface--;
In Fig. 1, line "207" connecting end of frame latch and level dectector 35 to signal generators 21a and 22a and Blanking Amplifier 31 should be renumbered --208--.

Signed and Sealed this

*sixteenth* Day of *December 1975*

[SEAL]

*Attest:*

RUTH C. MASON
*Attesting Officer*

C. MARSHALL DANN
*Commissioner of Patents and Trademarks*